(12) United States Patent
Furuya et al.

(10) Patent No.: US 7,283,704 B2
(45) Date of Patent: Oct. 16, 2007

(54) OPTICAL SIGNAL-ELECTRIC SIGNAL CONVERTER

(75) Inventors: Hiroyuki Furuya, Nara (JP); Akira Enokihara, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 333 days.

(21) Appl. No.: 10/518,527

(22) PCT Filed: Jun. 19, 2003

(86) PCT No.: PCT/JP03/07831

§ 371 (c)(1),
(2), (4) Date: Dec. 20, 2004

(87) PCT Pub. No.: WO04/001500

PCT Pub. Date: Dec. 31, 2003

(65) Prior Publication Data

US 2005/0232539 A1    Oct. 20, 2005

(30) Foreign Application Priority Data

Jun. 25, 2002    (JP)    ............................ 2002-183890

(51) Int. Cl.
*G02B 6/34* (2006.01)
(52) U.S. Cl. ...................... 385/37; 385/2; 385/5; 385/8
(58) Field of Classification Search .................. 383/37, 383/2, 5, 8
See application file for complete search history.

(56) References Cited

U.S. PATENT DOCUMENTS

| | | | |
|---|---|---|---|
| 4,922,091 A | | 5/1990 | Grischkowsky |
| 5,329,601 A | * | 7/1994 | Nakamura .................... 385/41 |
| 5,373,575 A | | 12/1994 | Yamamoto |
| 5,517,157 A | | 5/1996 | English |
| 5,517,757 A | * | 5/1996 | Hayashi et al. ......... 29/890.039 |
| 5,548,668 A | * | 8/1996 | Schaffner ........................ 385/1 |

(Continued)

FOREIGN PATENT DOCUMENTS

JP    03-245131    10/1991

(Continued)

OTHER PUBLICATIONS

Avetisyan, Y., et al., "Analysis of THz-wave surface-emitted difference-frequency generation in periodically poled lithium niobate waveguide", *Appl. Phys. B.*, 73, pp. 511-514 (2001).

(Continued)

*Primary Examiner*—Frank G. Font
*Assistant Examiner*—James P. Hughes
(74) *Attorney, Agent, or Firm*—Akin Gump Strauss Hauer & Feld LLP

(57) ABSTRACT

An optical signal to electrical signal converter of the present invention comprises an optical waveguide propagating a modulated optical signal therethrough; a pair of electrodes disposed at positions opposite to each other sandwiching the optical waveguide with in a region where an electric field reaches that is generated in the optical waveguide when the optical signal propagates through the optical waveguide; and a resonator coupled to the pair of electrodes, the resonator receiving for excitation an electrical signal induced at the pair of electrodes by the electric field.

12 Claims, 5 Drawing Sheets

U.S. PATENT DOCUMENTS

| | | | |
|---|---|---|---|
| 5,799,116 A | | 8/1998 | Yamamoto |
| 6,055,342 A | * | 4/2000 | Yi et al. .................. 385/2 |
| 6,144,679 A | | 11/2000 | Herman et al. |
| 6,885,781 B2 | * | 4/2005 | Glebov et al. ................ 385/8 |

FOREIGN PATENT DOCUMENTS

| | | |
|---|---|---|
| JP | 07-007322 A | 1/1995 |
| JP | 09-321700 A | 12/1997 |
| JP | 11-024117 A | 1/1999 |
| JP | 11-183949 A | 7/1999 |
| JP | 2003-015175 A | 1/2003 |

OTHER PUBLICATIONS

Lee, Y.-S., et al., "Generation of narrow-band terahertz radiation via optical rectification of femtosecond pulses in periodically poled lithium niobate", *Appl. Phys. Lett.*, vol. 76, No. 18, pp. 2505-2507 (2000).

Suhara, T., et al., "Theoretical Analysis of Laterally Emitting Terahertz-Wave Generation by Difference-Frequency Generation in Channel Waveguides", *IEEE J. Quantum Electron*, vol. 39, No. 1, pp. 166-171 (2003).

Peschel, U., et al., "Optical rectification in a traveling-wave geometry", *Physical Review A*, vol. 60, No. 6, pp. 4918-4926 (1999).

Loyo-Maldonado, V., et al., "Generation of Ultrashort Electrical Pulses in Semiconductor Waveguides", *CLEO 2002, Tuesday Afternoon*, pp. 256-257 (2002).

Kuri, T., et al., "Photonoic Downconversion Technique Without Remotely Fed Local Lighht for Millimeter-Wave-Band-Radio-on-Fiber Systems", *3rd Japan-Korea Joint Workshop on Microwave and Millimeter-Wave Photonics*, Technical Digest, pp. 91-94, (Jan. 24-25, 2002).

* cited by examiner

OPTICAL SIGNAL-ELECTRIC SIGNAL CONVERTER

CROSS-REFERENCE TO RELATED APPLICATION

This application is a Section 371 of International Application No. PCT/JP03/007831, filed Jun 19, 2003, which was published in the Japanese language on Dec. 31, 2003, under International Publication No. WO 2004/001500 A1, the disclosure of which is incorporated herein by reference.

1. Technical Field

The present invention relates to an optical signal to electrical signal converter using a nonlinear optical effect.

2. Background Art

Conventionally, as a device for converting an optical signal to an electrical signal there have been widely used an electronic tube represented by a photo-multiplier and a semiconductor photodetector represented by a photodiode. The electronic tube is a device which detects an optical signal utilizing the "external photo-electric effect" and the semiconductor photodetector detects an optical signal utilizing the "internal photo-electric effect" in the semiconductor.

The electronic tube has high detection sensitivity (signal amplification factor) and is often used still currently in uses for physics and chemistry, however, is large and needs a high-voltage power source for operation. Therefore, the electric tube is mostly not used in uses as a photodetector for optical communications.

In contrast, because the semiconductor photodetector is small and consumes a little electric power, it is used in a wide range of fields including the optical communication field. Among semiconductor photodetectors, pin-type photodiodes (pin-PD) are inexpensive and are used for various uses. However, avalanche photodiodes (APD) capable of responding at a high speed are used for high-speed optical communications. In recent years, pin-type photodiodes with an improved response speed have been also developed. Then, the current situation is such that these types of semiconductor photodetectors can be used with substantially no problem at the current communication speeds (bandwidth <60 GHz band).

However, there is a problem that the semiconductor photodetector can not respond sufficiently in an ultra-high frequency band where the communication speed exceeds 100 GHz. This is because the response speed of the semiconductor photodetector is limited by the mobility of electric carriers generated by the input of an optical signal.

For the pin-type photodiode, pairs of an electron and a hole are generated when light is incident on a light-absorbing layer of the photodiode. The mobility of the hole is smaller than that of the electron. The delay time that determines the response speed of the photodiode is limited by the drift speed of holes. In this manner, the response speed of the semiconductor photodetector is determined by factors including the carrier mobility inherent to the semiconductor material, the voltage applied and the drift length. However, even when these parameters are further increased, it is considered difficult to improve the response speed up to a response speed with which an optical signal modulated at a speed exceeding 100 GHz can be accurately detected.

The present invention was conceived in order to solve the above problem and the primary objective thereof is to provide an optical signal to electrical signal converter capable of converting an optical signal modulated at a high speed into an electrical signal.

DISCLOSURE OF THE INVENTION

An optical signal to electrical signal converter of the present invention comprises an optical waveguide for receiving and propagating a modulated optical signal; and a pair of electrodes disposed at positions opposite to each other sandwiching the optical waveguide within a region where an electric field applies, said electric field being generated in the optical waveguide by a nonlinear optical effect when the optical signal propagates through the optical waveguide.

In a preferred embodiment, the optical signal to electrical signal converter further comprises a resonator coupled to the pair of electrodes. The resonator is capable of be excited by an electrical signal induced at the pair of electrodes by the electric field.

In a preferred embodiment, the optical signal contains a side band signal corresponding to a modulation frequency $f_m$.

In a preferred embodiment, the optical waveguide is formed on a dielectric substrate or in the dielectric substrate, with the electrodes being supported by the dielectric substrate.

In a preferred embodiment, at least a portion of the optical waveguide and at least a portion of the dielectric substrate are formed from a nonlinear optical material and generate the electric field by an optical rectifying effect when the optical signal propagates through the optical waveguide.

In a preferred embodiment, the optical signal to electrical signal converter further comprises an electromagnetic wave radiating device coupled to the resonator and radiates the electrical signal as a radio signal.

In a preferred embodiment, the resonator and the electromagnetic radiating device are integrated with the substrate.

In a preferred embodiment, the resonator and the electrodes are connected by micro strip lines formed on the dielectric substrate.

In a preferred embodiment, the modulation frequency of the optical signal is 10 GHz or higher.

In a preferred embodiment, the optical signal to electrical signal converter further comprises a light beam input portion coupled to the optical waveguide.

In a preferred embodiment, the nonlinear optical material is a material selected from a group consisting of lithium niobate ($LiNbO_3$), lithium tantalate ($LiTaO_3$)-based material, potassium titanyl phosphate ($KTiOPO_4$)- based material, rare earth-calcium oxyborate ($RECa_4O(BO_3)_3$, RE: a Rare Earth element)-based material, DAST (4-dimethylamino-N-methyl-4-stilbazorium-toxyrate) and 3RDCVXY (dicyanovinyl termination-dimethyl substitution-diazo).

In a preferred embodiment, the optical waveguide has a periodic polarization inversion structure where the polarization direction is different from the polarization direction in the other portion.

In a preferred embodiment, the optical signal to electrical signal converter further comprises a resistor connecting electrically the pair of electrodes with each other.

In a preferred embodiment, the optical signal to electrical signal converter further comprises a housing accommodating the dielectric substrate.

BEST MODE FOR CARRYING OUT THE INVENTION

Figure 1:
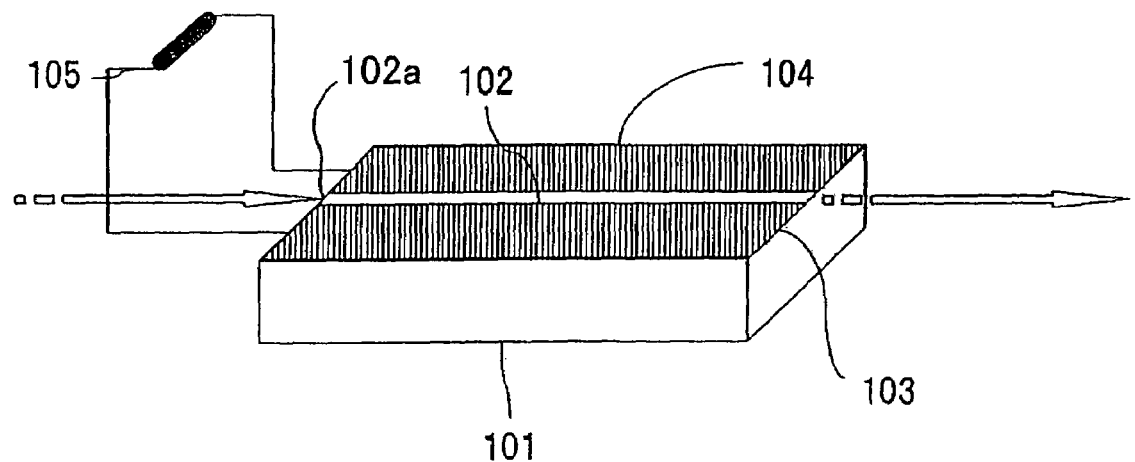
FIG. 1 is a perspective view showing an embodiment of an optical signal to electrical signal converter according to the present invention.

In the present invention, an optical signal is converted into an electrical signal without utilizing drifts of carriers excited by incident light, but by utilizing a nonlinear optical effect. Therefore, the response speed is not limited by the drift speed of the majority of carriers.

In the following, the principle of the operation of the optical signal to electrical signal converter according to the present invention will be described.

The polarization of a material having a nonlinear optical effect is represented by the following Eq. 1.

$$D = \epsilon E + P_{NL} \qquad \text{Eq. 1}$$

where D is an electric displacement vector (the electric flux density), $\epsilon$ is a dielectric constant, E is an electric field and $P_{NL}$ is nonlinear polarization.

As represented by Eq. 1, the electric displacement vector D is normally a sum of the nonlinear polarization $P_{NL}$ and the product of the dielectric constant $\epsilon$ and the electric field E. The term for the nonlinear polarization $P_{NL}$ can be represented by the following Eq. 2 taking into consideration only the quadratic nonlinear optical effect.

$$P_{NL} = \chi^{(2)} E \cdot E \qquad \text{Eq. 2}$$

where $\chi^{(2)}$ is the quadratic nonlinear polarizability.

The light incident on the nonlinear optical material is assumed to be represented as the sum of two (2) electric fields $E_1$ and $E_2$ represented in the following Eq. 3.

$$E_1 = E_{01} \cos(\omega_1 t - \kappa_1 r + \phi_1),$$

$$E_2 = E_{02} \cos(\omega_2 t - \kappa_2 r + \phi_2) \qquad \text{Eq. 3}$$

where $\omega_1$ and $\omega_2$ are frequencies of light beams, t is the time, $\kappa_1$ and $\kappa_2$ are wave numbers of the light and $\phi_1$ and $\phi_2$ are phases of the light.

Using Eq. 3, the square of the electric field E in Eq. 2 is represented as follows.

$$E \cdot E = (E_1 + E_2) \cdot (E_1 + E_2) = E_{01}^2 \cos^2(\omega_1 t - \kappa_1 r + \phi_1) + 2E_{01}E_{02}\cos(\omega_1 t - \kappa_1 r + \phi_1) \cdot \cos(\omega_2 t - \kappa_2 r + \phi_2) + E_{02}^2 \cos^2(\omega_2 t - \kappa_2 r + \phi_2) \qquad \text{Eq. 4}$$

Using the relationship of $\cos 2\theta = 2\cos^2\theta - 1$, Eq. 4 is represented as "Term A+Term B+Term C+Term D+Term E" in the following Eq. 5.

$$E \cdot E = \frac{1}{2}(E_{01}^2 + E_{02}^2) \text{ (Term } A) + \frac{1}{2}E_{01}^2 \cos(2\omega_1 t - 2\kappa_1 r + 2\phi_1) \text{ (Term } B) + \frac{1}{2}E_{02}^2 \cos(2\omega_2 t - 2\kappa_2 r + 2\phi_2) \text{ (Term } C) + E_{01}E_{02}\cos[(\omega_1 + \omega_2)t - (\kappa_1 + \kappa_2)r + (\phi_1 + \phi_2)] \text{ (Term } D) + E_{01}E_{02}\cos[(\omega_1 - \omega_2)t - (\kappa_1 - \kappa_2)r + (\phi_1 - \phi_2)] \text{ (Term } E) \qquad \text{Eq. 5}$$

Term A of Eq. 5 is a term for optical rectification. Term B and Term C represent generation of the secondary harmonics, Term D represents generation of the summed frequency, and Term E represents generation of the differential frequency.

According to the present invention, using the effect represented by Term E among the nonlinear optical effects represented in Eq. 5, an optical signal is converted into an electrical signal. This point will be described in detail as follows.

For a light beam (having the central frequency of 1.5 µm) modulated with a signal having the central frequency of, for example, 26 GHz band by an optical modulating device, a peak called "side band" is generated at a position 0.19 nm away from the central frequency. In general, representing the frequency of the modulating signal as $f_m$Hz, the frequency $\lambda_{sb}$ at which the side band is generated is represented as the following Eq. 6.

$$\lambda_{sb} = \lambda_C + \Delta\lambda$$

$$\Delta\lambda = \lambda_C - C\lambda_C/(C + f_m\pi) = f_m\lambda_C^2/(C + f_m\lambda_C) \qquad \text{Eq. 6}$$

C: the light velocity
$\lambda_C$: the central frequency of the light beam
$f_m$: the frequency of the modulating signal The optical signal to electrical signal converter of the present invention carries out the conversion into a modulated signal by the generation of the differential frequency (Eq. 7) between the wavelength $\lambda_{sb}$ of this side band and the central wavelength $\lambda_C$.

$$\omega_m = \omega_{sb} - \omega_C$$

That is, $$1/\lambda_m = 1/\lambda_{sb} - 1/\lambda_C = f_m/C \qquad \text{Eq. 7}$$

$\omega_m$: the angular frequency of the modulating signal
$\omega_{sb}$: the angular frequency of the side band
$\omega_C$: the angular frequency of the central frequency
$\omega_m$: the wavelength of the modulating signal
$\omega_{sb}$: the wavelength of the side band
$\omega_C$: the central wavelength Here, for convenience, the case where two light beams each having a frequency (wavelength) different from each other are input into a nonlinear optical material is considered. However, the case where one light beam having one frequency (wavelength) is input may be considered similarly to the above case.

Now, a preferable embodiment of the optical signal to electrical signal converter according to the present invention will be described.

FIRST EMBODIMENT

First, referring to FIG. 1, the configuration of the optical signal to electrical signal converter of the embodiment will be described.

The optical signal to electrical signal converter of the embodiment has a dielectric substrate 101 formed from a nonlinear optical material, an optical waveguide 102 formed on the upper face of the substrate 101 and a pair of electrodes 103 and 104 provided at positions opposite to each other sandwiching the optical waveguide 101 on the upper face of the substrate 101.

An optical signal to be detected is incident on the input portion 102a of the optical waveguide 102 and propagates through the optical waveguide 102 from the left to the right in the figure. At this time, an electric field is generated by the differential frequency generation effect among the nonlinear optical effects. The pair of electrodes 103 and 104 is provided within a region where the electric field generated in the optical waveguide 102 reaches.

According to the composition of the embodiment, variation of the electric field generated when the optical signal propagates through the optical waveguide 102 from the left to the right in the figure can be detected through the electrodes 103 and 104. As has been described, this electric field is formed in the optical waveguide and in the vicinity of the optical waveguide by the differential frequency generation of the nonlinear optical effect. In order to convert the optical signal into an electrical signal by generating such a differential frequency, the optical signal inputted needs to be a signal modulated such that the optical signal has a side band signal.

In the embodiment, lithium niobate ($LiNbO_3$) substrate may be preferably used as the dielectric substrate 101. The material of the substrate 101 is not limited to lithium niobate ($LiNbO_3$), and lithium tantalate ($LiTaO_3$), potassium titanyl phosphate ($KTiOPO_4$), rare earth-calcium oxyborate ($RECa_4O(BO_3)_3$, RE: a Rare Earth element), DAST (4-dimethylamino-N-methyl-4-stilbazorium-toxyrate) or 3RDCVXY (dicyanovinyl termination-dimethyl substitution-diazo) may also be used.

Next, a method for manufacturing the optical signal to electrical signal converter shown in FIG. 1 will be described.

First, ultrasonic cleaning is applied to the substrate 101 in a liquid such as distilled water, acetone or alcohol. Thereafter, ultrasonic cleaning is applied to the substrate 101 also in acetic acid for one minutes or less. Again, ultrasonic cleaning is applied to the substrate 101 in a liquid such as distilled water, acetone or alcohol.

Next, a resist mask for defining the position and the shape of the optical waveguide 102 is formed on the upper face of the substrate 101 using a photo-lithography method. Thereafter, a Ti film is deposited on the resist mask using an electron beam deposition method. The thickness of the Ti film is set at, for example, 40-50 nm.

Next, the portion of the Ti film except the area where the optical waveguide 102 is to be formed on is removed using a lift-off method. In this manner, a Ti film patterned to define the area where the optical waveguide is formed. The method to form the Ti film is not limited to the electron beam deposition method, and sputtering such as the RF magnetron sputtering method may be used.

Next, the substrate 102 on which the patterned Ti film is present on the surface is loaded into a tube furnace and Ti is diffused in the surface region of the substrate 102. The tube furnace has a heater and a quartz tube heated by this heater. The substrate 101 is set on a quartz boat placed in the quartz tube. As the ambient gas in the quartz tube, Ar gas containing steam and having the humidity of 80% or more is used for the first five hours of the diffusion process. After the first five hours, the ambient gas is switched to $O_2$ gas containing steam and having the humidity of 80% or more and the substrate 101 is heated for around one hour. The temperature for heating is set at, for example, around 1,000° C. The reason why the substrate 101 is heated in the $O_2$ atmosphere for the last one hour of the Ti diffusion process is in order to compensate the oxygen defects generated in the substrate 101.

In this manner, the optical waveguide 102 is formed on the substrate 101. The method for forming the optical waveguide 102 is not limited to the Ti diffusion method, and methods in which transition metals such as V (vanadium), Ni (nickel) and Cu (cupper) are respectively diffused may be used. Otherwise, a method in which protons exchange is carried out by dipping the substrate 101 in the melted salt of benzoic acid for around 24 hour may be employed.

When an organic nonlinear optical material such as DAST (4-dimethylamino-N-methyl-4-stilbazorium-toxyrate) or 3RDCVXY (dicyanovinyl termination-dimethyl substitution-diazo) is used for the substrate 101, it is preferable to form the optical waveguide using a refractive index variation method (photo-bleaching method) employing illumination of a UV light beam.

The width and the depth of the optical waveguide 102 are both around 5 μm in this embodiment. However, the width and the depth of the optical waveguide 102 are optimized with the wavelength of the optical signals to be guided.

Next, the electrodes 103 and 104 extending along the optical waveguide 102 are formed. More specifically, first, an aluminum film is deposited on the upper face of the substrate 101 formed with the optical waveguide 102, using the electron beam deposition method. The material for the electrode is not limited to aluminum, and simple substances or alloys of platinum, gold, titanium, germanium etc. may be used. After depositing the metal film or a film of another conductive material, the electrodes 103 and 104 can be formed by patterning the conductive film using various methods. The patterning of the electrodes 103 and 104 may be carried out using the lift off method.

It is preferable to form a thin film made of $SiO_2$, $HfO_2$ or SiN, that works as a protective film, over the whole area of the upper face of the substrate 101 before forming the electrodes 103 and 104.

Next, a terminal resistor 105 (50 Ω) is connected respectively with one end of each of the electrodes 103 and 104 such that the terminal resistor 105 bridges the electrodes 103 and 104 and the converter shown in FIG. 1 is completed. Relaxation of the difference in the phase velocity between an optical signal and an electrical signal can be achieved by the terminal resistor 105 as the electrodes of a traveling-wave-type optical modulator.

The effective nonlinear optical constant $d_{eff}$ of a nonlinear optical material is proportional quadratically to the power of a generated electrical signal as represented in Eq. 8.

$$P = A d_{eff}^2 L^2 P_1 P_2 [(\sin x)/x]^2 / n_1 n_2 n_3 \lambda_3 \qquad \text{Eq. 8}$$

A: proportional constant
$d_{eff}$: nonlinear optical constant
L: the length of a crystal
$P_1$: the power of an input light beam 1
$P_2$: the power of an input light beam 2
$n_1$: refractive index to the input light beam 1
$n_2$: refractive index to the input light beam 2
$n_3$: refractive index to an output (a square of the dielectric constant)
$\lambda_3$: the wavelength of the output The above input light beam 1 is a signal at the central frequency of an optical signal inputted into the waveguide and the input light beam 2 is a signal of the side band.

From the above, it is preferable to form the optical waveguide using a material having a high effective nonlinear optical constant $d_{eff}$. Generally, organic nonlinear optical materials have higher effective nonlinear optical constants $d_{eff}$ than inorganic nonlinear optical materials. Therefore, the detection sensitivity for optical signals is more improved and conversion efficiency from an optical signal into an electrical signal is more enhanced when an organic nonlinear optical material is used. The effective nonlinear optical constant $d_{eff}$ of LiNbO$_3$ crystal that is one of the inorganic crystal having a relatively high effective nonlinear optical constant is around 30 pm/V. In contrast, the effective nonlinear optical constant $d_{eff}$ of DAST crystal that is one of organic crystals is 1,000 pm/V that is a high value of 30 times as high as or higher than the effective nonlinear optical constant $d_{eff}$ of LiNbO$_3$. Therefore, DAST is preferably used as the material for the substrate or the optical waveguide of the embodiment.

An effective nonlinear optical constant $d_{eff}$ varies depending on the direction of incidence of a light beam. Therefore, the direction of incidence of a light beam is preferably in the x-y plane when a lithium-niobate-based or a lithium-tantalate-based crystal is used.

For not only the niobate-based nonlinear optical crystal but also effective nonlinear optical crystals, each of the equations representing the incident angle of a light beam to a crystal and the effective nonlinear optical constant $d_{eff}$, using the crystal system (the point group and the space group) that the crystal has is different between the two kinds of crystals. Therefore, it is necessary to select an angle at which the effective nonlinear optical constant $d_{eff}$ becomes maximal according to the kind of the crystal.

For example, for a LiNbO$_3$ crystal, because the crystal is a uniaxial crystal and has a point group 32, Eq. 9 representing the crystalline angle and the effective nonlinear optical constant is represented as follows.

$$d_{eff} = d_{11} \cos 2\theta \sin 3\phi \qquad \text{Eq. 9}$$

where θ is the angle formed by the z-axis and a component projected onto the x-z plane of the dielectric principal axis in the incident direction of the light beam, and φ is the angle formed by the x-axis and a component projected onto the x-z plane of the dielectric principal axis in the incident direction of the light beam.

The optical signal to electrical signal converter according to the present invention can further reduce the difference in the phase velocity between an optical signal and an electrical signal by introducing a polarization inversion structure into the optical waveguide section. The optical signal to electrical signal converter can also carry out pseudo matching of velocities by introducing the polarization inversion structure. Then, a higher effective nonlinear optical constant $d_{eff}$ can be obtained than the case where matching of velocities is carried out by the incident angle of the light beam into the crystal. The sensitivity can be improved and the conversion efficiency from an optical signal to an electrical signal can be made higher by introducing the polarization inversion structure.

SECOND EMBODIMENT

Figure 2:
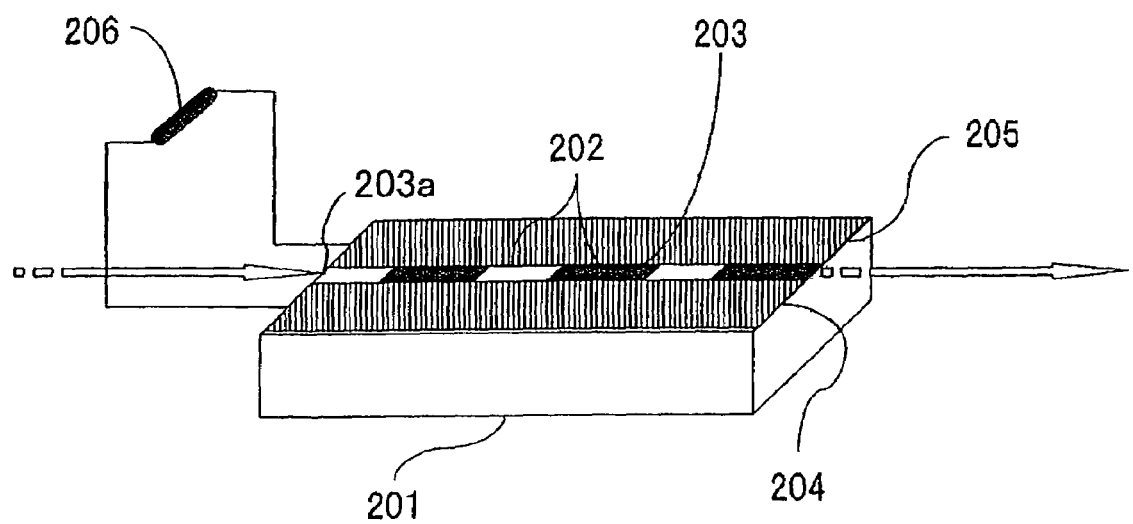
FIG. 2 is a perspective view showing another embodiment of the optical signal to electrical signal converter according to the present invention.

Next, referring to FIG. 2, a second embodiment equipped with an optical waveguide having a structure in which polarization is periodically inverted will be described.

The basic structure of the embodiment is almost same as the structure of the converter shown in FIG. 1 except an optical waveguide 203 having a polarization inversion structure 202. That is, an optical signal to electrical signal converter of the embodiment has a substrate 201, the optical waveguide 203 formed on the upper face of the substrate 201 and a pair of electrodes 204 and 205 provided at positions opposite to each other on the upper face of the substrate 201. When an optical signal incident upon the input portion 203a which is located at an end of the optical waveguide 203 propagates through the optical waveguide 203 from the left to the right in the figure, an electric field is generated by the differential frequency generation effect among the nonlinear optical effects. The pair of electrodes 204 and 205 is provided within a region where the electric field generated in the optical waveguide 202 reaches. One end of each of the electrodes 204 and 205 is connected with each other by a terminal resistor 206.

The material, the size and the manufacturing method of this converter are basically same as those described for the first embodiment. Because the different point of the embodiment from the first embodiment is that the polarization inversion structure 202 is manufactured, this point will be described as follows.

In the embodiment, first, metal electrodes are deposited on the substrate 201 using the electron beam deposition method. More specifically, comb-type electrodes are formed on the upper face of the substrate 201 and a front-face electrode is formed on the back face of the substrate 201. As the material for the metal electrodes, simple substances or alloys of aluminum, platinum, gold, titanium, germanium, nickel or etc. is preferably used. The comb-type electrodes are manufactured by patterning the electrodes with photo-lithography and etching techniques after depositing the metal film on the substrate 201. However, the comb-type electrodes may be formed using the lift off method after forming a patterned resist mask on the substrate and depositing a metal film.

After the comb-type electrodes have been completed, the direction of the polarization in a specific area of the optical wave guide 202 is inverted against the direction of the polarization in the other area by forming an electric field between the electrodes on the upper face of the substrate 201 and the electrode on the back face of the substrate 201.

The polarization inversion period $\Lambda = 2L_C$ is calculated from the following Eq. 10 or Eq. 11.

$$L_C = \lambda_m / 2(n_g - n_m) \qquad \text{Eq. 10}$$

$$L_C = \tfrac{1}{2} f_m (1/v_m - 1/v_g) \qquad \text{Eq. 11}$$

where $L_C$ is the coherence length, $n_g$ is the refractive index of a light beam, $n_m$ is the refractive index of an electric wave, $v_g$ is the group velocity of the light beam, $v_m$ is the phase velocity of the electric wave, $\lambda_m$ is the wavelength of an electromagnetic wave and $f_m$ is the frequency of the electric wave.

In the embodiment, a He—Ne laser beam is used as the optical signal and, because $f_m$ is 26 GHz, $v_m$ is $6.4 \times 10^7$ m/s, $v_g$ is $1.36 \times 10^8$ m/s, the coherence length is 2.4 mm and the polarization inversion period is 4.7 mm.

After forming the polarization inversion structure 202, ultrasonic cleaning is applied to the substrate 201 in a liquid such as distilled water, acetone or alcohol. The manufacturing process thereafter is same as the process described for the first embodiment.

In each of the above embodiments, the arrangement for detecting an electrical signal through the electrodes is not limited especially. The electrical signal may be amplified using a known high-sensitivity detection circuit. However, because the electrical signal converted from an optical signal is very weak in the optical signal to electrical signal converters in the above embodiments, it is preferable to equip a mechanism for amplify the very weak signal easily.

Description will be given below of an embodiment in which the electrical signal converted from an optical signal is amplified using a resonator.

THIRD EMBODIMENT

Now, a third embodiment of the optical signal to electrical signal converter according to the present invention will be described. In the embodiment, a polarization inversion structure is introduced into the optical waveguide section as well as an antenna (electromagnetic wave radiation device) is connected to the electrodes through a dielectric resonator. The periodic polarization inversion structure in the embodiment has the same structure as the structure in the second embodiment.

Figure 3:
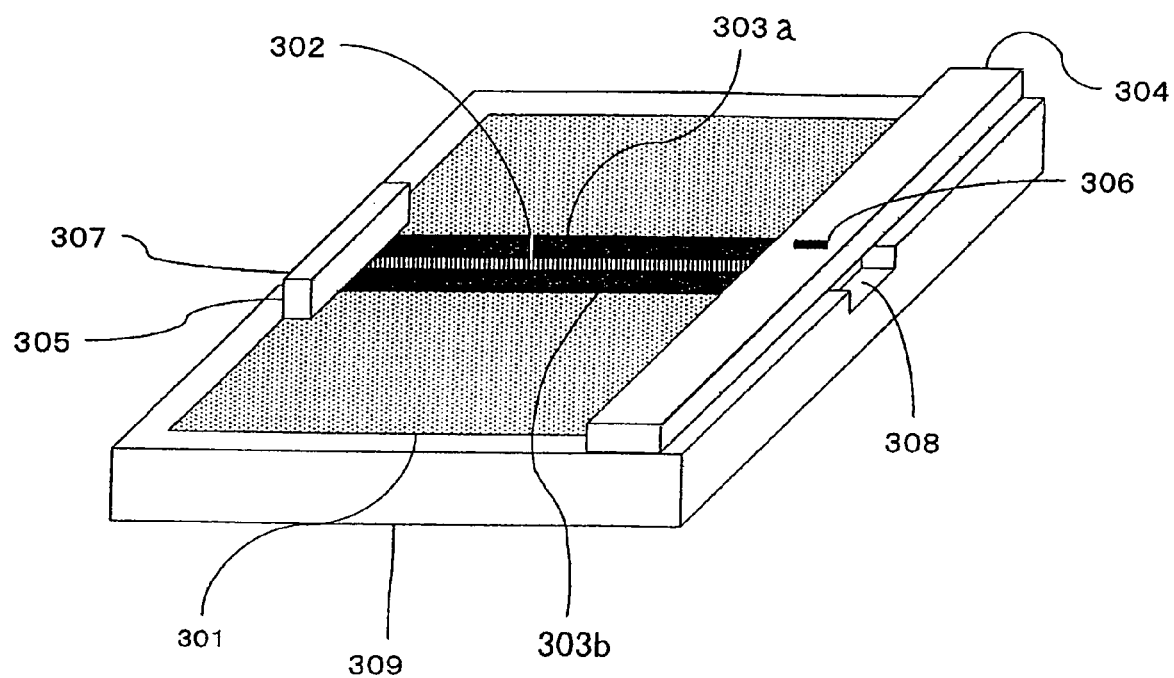
FIG. 3 is a perspective view showing a yet another embodiment of the optical signal to electrical signal converter according to the present invention.

Referring to FIG. 3, the converter of this embodiment will be described.

The converter has a substrate 301 accommodated in the housing 309. Similarly to the second embodiment, an optical waveguide 302 having the periodic polarization inversion structure is formed on the substrate 301. A pair of electrodes 303a and 303b is formed positions opposite to each other sandwiching the optical waveguide 302 on the upper face of the substrate 301. When an optical signal is incident on the input portion located at an end of the optical waveguide 302 propagates through the optical waveguide 302 from the left to the right in the figure, an electric field is generated by the nonlinear optical effect. The pair of electrodes 303a and 303b is provided within a region where the electric field generated in the optical waveguide 302 reaches.

A dielectric resonator 304 equipped with an electromagnetic wave radiation mechanism 306 is provided on a section located on an optical outgoing side 308. A terminal resistor 305 (50 Ω) is formed on an optical incidence side 307.

Figure 4:
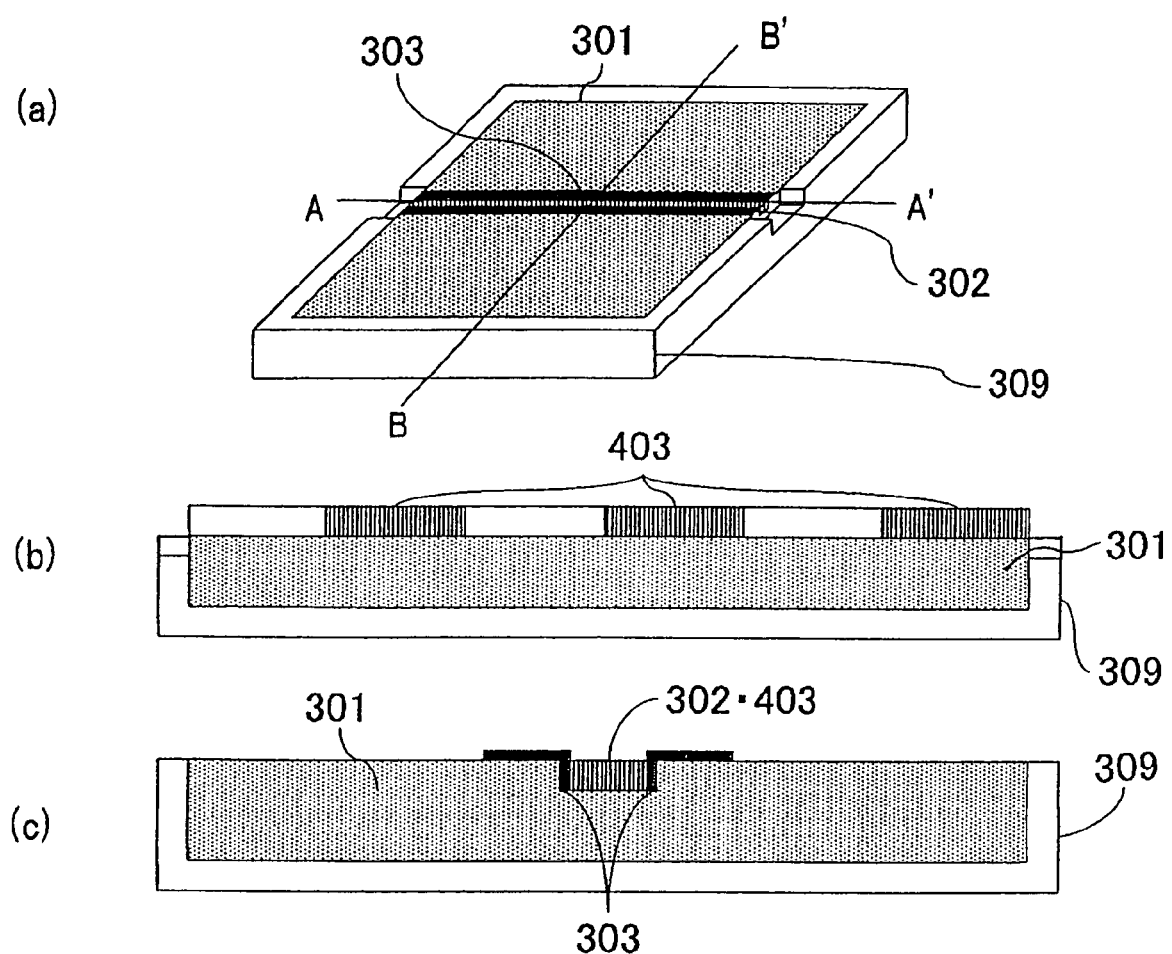
FIG. 4(a) is a perspective view showing the main portion of the optical signal to electrical signal converter of FIG. 3, with a resonator removed therefrom.
FIG. 4(b) is a cross-sectional view of the main portion taken along the line A-A' of FIG. 4(a)
FIG. 4(c) is a cross-sectional view of the main portion taken along the line B-B' of FIG. 4(a)

Next, referring to FIG. 4(a) to FIG. 4(c), the configuration of the converter of the embodiment will be described more specifically. FIG. 4(a) is a perspective view showing the main portion, in which the resonator is removed from the optical signal to electrical signal converter of the embodiment. FIG. 4(b) is a cross-sectional view of the main portion along the line A-A' in FIG. 4(a) and FIG. 4(c) is a cross-sectional view of the main portion along the line B-B' in FIG. 4(a).

As shown in FIG. 4(b), a polarization inversion structure 403 is formed in the optical waveguide 302 on the substrate 301 accommodated in the housing 309. The polarization inversion structure 403 is a structure in which areas where the polarization direction of the material of the substrate is inverted are arranged periodically. The cycle of the arrangement is set at a length equal to the coherent length of an optical signal input. The optical waveguide 302 in the embodiment is designed to propagate an optical signal having the wavelength of 633 nm.

The housing is a case made of metal covering the bottom face and the side faces of the substrate 301 and cutouts are formed in portions each corresponding respectively to the sections for the optical signals to enter and go out of the substrate 301. In order to reduce the influence of the external electromagnetic waves, the housing 309 preferably has a shape such that the upper face of the substrate 301 is covered with a cover section (not shown).

As shown in FIG. 4(c), the electrodes 303 (303a and 303b) are formed along the optical waveguide 302 and can detect a very weak electric field generated in the optical waveguide 302. A portion of each of the electrodes 303a and 303b in the embodiment is buried inside the substrate 301 from the upward. However, the electrodes may not have such a structure. For example, electrodes obtained by patterning a metal film deposited on the upper face of the substrate 301 may be used.

Figure 5:
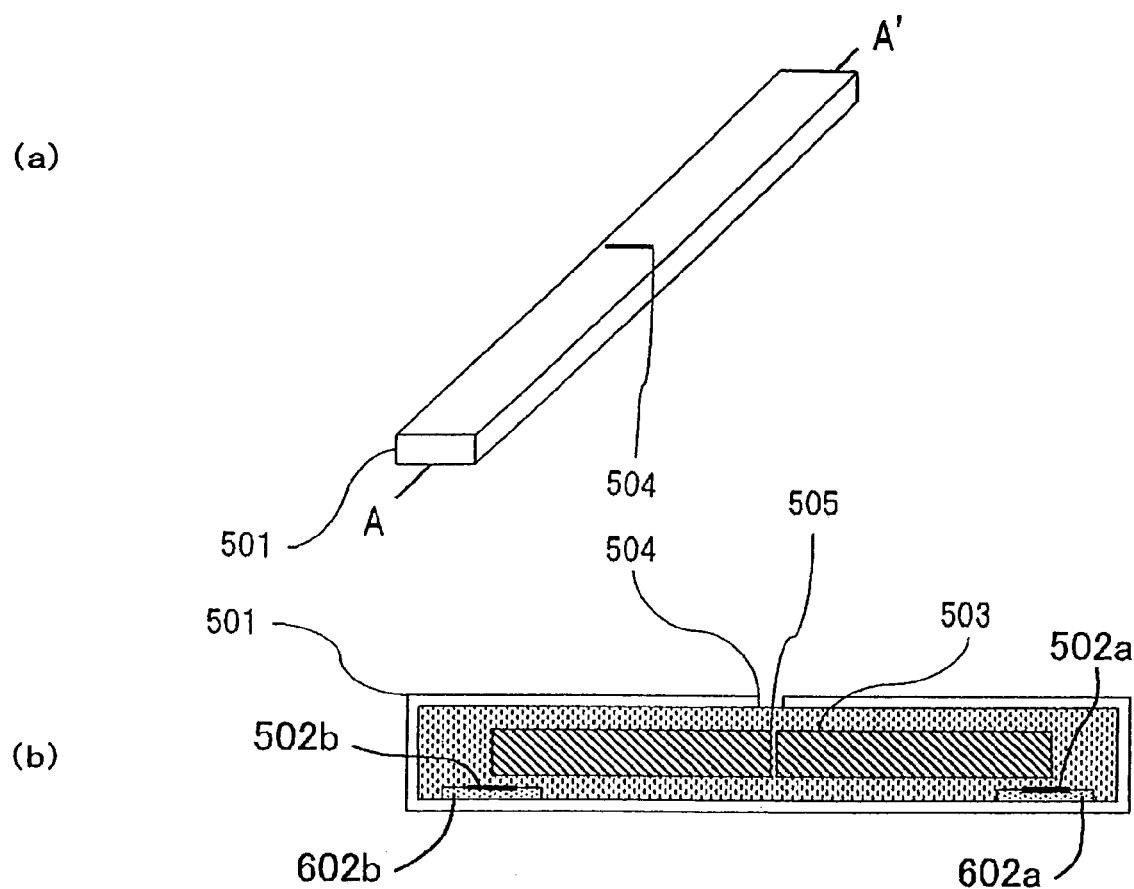
FIG. 5(a) is a perspective view of a dielectric resonator antenna of the optical signal to electrical signal converter of FIG. 3.
FIG. 5(b) is a cross-sectional view of the dielectric resonator antenna taken along the line A-A' of FIG. 5(a)

Next, referring to FIG. 5(a) and FIG. 5(b), a dielectric resonator section and an electromagnetic field radiation mechanism will be described. FIG. 5(a) shows the schematic composition of the dielectric resonator. FIG. 5(b) is a cross-sectional view of the dielectric resonator along the line A-A' in FIG. 5(a).

A dielectric resonator 304 comprises a metal housing 501 for insulating the electromagnetic field inside the resonator from the exterior and a high-dielectric-constant dielectric 503 arranged inside the housing 501. A material having a relatively low dielectric constant (for example, a material having a commercial name, Teflon (registered trade mark)) is inserted between the high-dielectric-constant dielectric 503 and the housing 501. The high-dielectric-constant dielectric 503 is surrounded and held by this low-dielectric-constant material.

The high-dielectric-constant dielectric 503 of the embodiment is separated into two sections and a slit 505 is formed in the spacing between the two sections in order to enhance the electric field inside the resonator. Furthermore, the housing 501 is provided with a slit 504 at a position opposite to the slit 505 of the high-dielectric-constant dielectric 503 in order to radiate electromagnetic waves.

Figure 6:
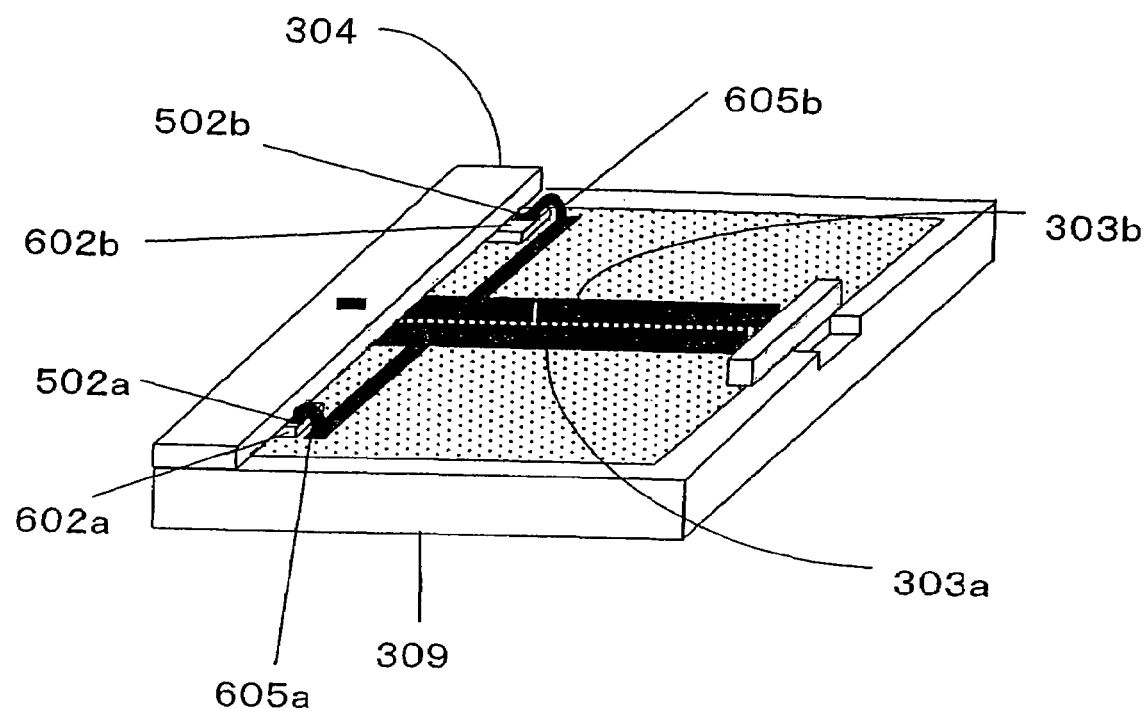
FIG. 6 is a perspective view showing connections between electrodes and the dielectric resonator in the converter of FIG. 3.

As shown in FIG. 6, the high-dielectric-constant dielectric 503 of the dielectric resonator 304 is electromagnetically coupled to micro strip lines 502a and 502b. FIG. 6 is a perspective view showing the converter of the embodiment shown in FIG. 3. As can be seen from FIG. 6, one end of each of the micro strip line 502a and 502b is respectively formed on each of alumina substrates 602a and 602b and is connected respectively with a branch line of the electrodes 303a and 303b through bonding wires 605a and 605b.

An electrical signal induced at the electrodes 303a and 303b when an optical signal propagates through the optical waveguide is transmitted to the micro strip lines 502a and 503a through the bonding wires 605a and 605b shown in FIG. 6 and is guided to the inside of the dielectric resonator 304. The various parameters of the dielectric resonator 304 are designed such that this electrical signal resonates inside the dielectric resonator 304.

In order to accumulate efficiently the energy of the electrical signal using the resonance inside the dielectric resonator 304, it is preferable to provide a switch for selectively open and close the slit 505, to the dielectric resonator 304. Because leak of the electromagnetic field to the exterior is suppressed and the Q value of the resonator is increased while this switch is closed, the energy of the electrical signal is amplified. The electrical signal having the energy amplified in the resonator is radiated to the exterior of the resonator as an electromagnetic wave by opening the switch.

The dielectric constant becomes drastically low relative to the inside of the resonator at the slit 505 while the slit 505 is open. Therefore, the electromagnetic field of the electrical signal propagated through the high-dielectric-constant dielectric 503 becomes drastically enhanced at the portion at the slit 505. Because the slit 504 of the housing 501 is arranged in the vicinity of the portion where the electric field is enhanced in this manner, the electrical signal propagated through the micro strip lines 502a and 502b is converted into an electromagnetic wave and is radiated from the slit 504 to the exterior of the resonator.

The dielectric resonator 304 in the embodiment is designed to resonate in $TM_{11}\delta$ mode. For example, when an electrical signal at 26 GHz is radiated as an electromagnetic wave, the length of the slit 504 is set at approximately 3 mm and the width of the slit 504 is set at 0.6 mm.

Assuming the dielectric constant of vacuum $\epsilon_0$ is 24 and the relative dielectric constant at the slit 504 $\epsilon_r$ is 1, the electric flux density D is equal to $\epsilon_r \epsilon_0 E$ and is constant both inside the dielectric resonator 304 and in the portion at the slit 504. Therefore, the electric field E is enhanced to a magnitude 24 times as strong as the original magnitude when the electric field goes out of the inside of the resonator having a high relative dielectric constant to the exterior of the resonator through the slit 504. Because the electric field energy is accumulated inside the dielectric resonator 304, the generated electric field energy itself can be enhanced by the resonator. In the embodiment, the Q value of the dielectric resonator 304 can be set at around 2,000.

When the substrate 301 is formed from a DAST crystal, the electric field generated between the electrodes when an optical signal propagates through the optical waveguide is around 80 μV/m. However, the electric field can be enhanced to a magnitude exceeding 2,000 times as strong as the original magnitude by using the resonator of the embodiment.

The high-dielectric-constant dielectric 503 is formed from, for example, a $MgYiO_3$—$CaTiO_3$-based ceramic. The cross section of the high-dielectric-constant dielectric 503 is 1 mm×1 mm and the length in the longitudinal direction of the high-dielectric-constant dielectric 503 is 5 mm.

The housing 501 in the embodiment has a shape of, for example, a rectangle having a cross section of 3 mm×3 mm and the length in the longitudinal direction of 15 mm. The housing 501 has a structure in which PTFE is filled with between the housing 501 and the high-dielectric-constant dielectric 503.

Dielectric ceramic materials represented by $Zr$—$TiO_4.BaTiO_3$ may be used for the high-dielectric-constant dielectric 503. Because the dielectric constant differs according to the dielectric material, the dimensions of the housing 501 and the dimensions of the dielectric resonator 304 need to be changed.

The resonator in the embodiment is designed to resonate in $TM_{11}$ δ mode. However, the resonator may be designed to resonate in another mode such as $TE_{10}$ mode. Furthermore, in the embodiment, though the slit 504 working as the electromagnetic wave radiation mechanism is provided to the housing 501 of the resonator 304, the amount of electric wave radiation can be increased by providing a conductive electrode in a state where the electrode is not grounded to the resonator housing. The slit 504 provided to the housing 501 of the resonator 304 operates as a slot antenna. However, the slit 504 may be operated as a dielectric antenna by further mounting another dielectric resonator to the slit 504.

As described above, according to the optical signal to electrical signal converter of each of the above embodiments, an optical signal can be converted into an electrical signal by inputting the optical signal into an optical waveguide and propagating the optical signal through the optical waveguide. Then, the electrical signal is amplified by the resonator. Therefore, an ultra-high-speed-modulated light beam can be accurately detected.

Furthermore, the converter can be made compact by providing the optical waveguide, the electrodes and the antenna integrated on the base material. Therefore, when information is transmitted and received between various communication devices or between electric devices, it is easy to incorporate the converter into any of those devices.

As described above, according to the embodiments of the present invention, it is also easy to control communication devices and electric devices, by each other by radio, that can easily convert an optical signal sent through optical signal transmission means such as an optical fiber, into a radio signal. Furthermore, dissemination of "net home appliances" that are the existing home appliances controlled by radio can be further facilitated.

According to the above embodiments, an optical signal is detected using the optical waveguide. Therefore, the sensitivity and the conversion efficiency can be enhanced due to the pseudo velocity matching. Especially, when the periodic polarization inversion structure is used, the converter can be applied to the detection of an optical signal having an arbitrary wavelength and at an arbitrary frequency by properly designing the polarization inversion period, the optical waveguide and the dielectric resonator.

Needless to say, the various materials and the device compositions used in the present invention are not limited to the materials and compositions used in the embodiments described above. The optical signal to electrical signal converter of the present invention can be realized using materials other than the above-described dielectric materials and the nonlinear optical materials.

INDUSTRIAL APPLICABILITY

According to the present invention, high-speed responses can be achieved because an optical signal can be converted into an electrical signal without utilizing the drift of electric charges (carriers). Furthermore, a high-efficiency conversion from an optical signal to an electrical signal is realized by amplifying with a resonator an electrical signal converted from an optical signal and radiating the electrical signal from an antenna as an electromagnetic wave. According to the present invention, an optical signal to electrical signal converter that is small-sized and capable of high-speed operation can be provided.

The invention claimed is:

1. An optical signal to electrical signal converter comprising:
    an optical waveguide for receiving and propagating an optical signal that has been modulated so as to have a side band represented by:

$\lambda_{sb} = \lambda_C + \Delta\lambda$ $\Delta\lambda = \lambda_C - (C\lambda_C/(C+f_m\pi)) = f_m\lambda_c^2/(C+f_m\lambda_C)$ where $f_m$ is the frequency in Hertz (Hz) of the modulating signal, $\lambda_{sb}$ is a wavelength at which the side band generates, C is the velocity of light, and $\lambda_c$ is the center frequency of the light; and
    a pair of electrodes disposed within a region where an electric field applies, said electric field being generated in the optical waveguide by a nonlinear optical effect when the optical signal propagates through the optical waveguide,
    wherein the optical waveguide is formed on a dielectric substrate or in the dielectric substrate, and
    wherein the pair of electrodes are provided on a top surface of the dielectric substrate, said pair of electrodes being opposite to each other with the optical waveguide interposed between the electrodes,
    wherein the optical signal is incident on a side surface of the dielectric substrate parallel to the longitudinal direction of the pair of electrodes, and
    wherein when the optical signal is incident on the side surface of the dielectric substrate, a variation in the electric field generated in the optical waveguide is output as an electrical signal from the pair of electrodes.

2. An optical signal to electrical signal converter according to claim 1, further comprising a resonator coupled to the pair of electrodes, the resonator being capable of being excited by an electrical signal induced at the pair of electrodes by the electric field.

3. An optical signal to electrical signal converter according to claim 1, wherein at least a portion of the optical waveguide and at least a portion of the dielectric substrate are formed from a nonlinear optical material, and the electric field is generated by a differential frequency generation when the optical signal propagates through the optical waveguide.

4. An optical signal to electrical signal converter according to claim 3, further comprising an electromagnetic wave radiating device coupled to the resonator, wherein the optical signal to electrical signal converter radiates the electrical signal as a radio signal.

5. An optical signal to electrical signal converter according to claim 2, wherein the resonator and the electromagnetic wave radiating device are integrated with the substrate.

6. An optical signal to electrical signal converter according to claim 5, wherein the resonator and the electrodes are connected by micro strip lines formed on the dielectric substrate.

7. An optical signal to electrical signal converter according to claim 1, wherein a modulation frequency of the optical signal is 10 GHz or higher.

8. An optical signal to electrical signal converter according to claim 1, further comprising a light beam input portion coupled to the optical waveguide.

9. An optical signal to electrical signal converter according to claim 3, wherein the nonlinear optical material is a material selected from a group consisting of lithium niobate ($LiNbO_3$), lithium tantalate ($LiTaO_3$)-based material, potassium titanyl phosphate ($KTiOPO_4$)-based material, rare earth-calcium oxyborate ($RECa_4O(BO_3)_3$, RE: a Rare Earth element)-based material, DAST (4-dimethylamino-N-methyl-4-stilbazorium- toxyrate) and 3RDCVXY (dicyanovinyl termination-dimethyl substitution-diazo).

10. An optical signal to electrical signal converter according to claim 1, wherein the optical waveguide has a periodic polarization inversion structure where the polarization direction is inverted periodically along the optical waveguide.

11. An optical signal to electrical signal converter according to claim 1, further comprising a resistor connecting electrically the pair of electrodes with each other.

12. An optical signal to electrical signal converter according to claim 1, further comprising a housing accommodating the dielectric substrate.

* * * * *